United States Patent Office 3,743,704
Patented July 3, 1973

3,743,704
REMOVAL OF HF FROM AN HF-CONTAINING GAS
Norman Eugene West, Vienna, W. Va., assignor to E. I. du Pont de Nemours and Company, Wilmington, Del.
No Drawing. Filed May 12, 1971, Ser. No. 142,755
Int. Cl. C01f 11/22
U.S. Cl. 423—490
4 Claims

ABSTRACT OF THE DISCLOSURE

HF is removed from an HF-containing gas by scrubbing the gas with water, whereby the HF from the gas enters the aqueous phase to form an aqueous solution of HF, and the gas phase is vented as virtually HF-free gas. Precipitation of the fluoride ion in the aqueous solution as $CaF_2$ is carried out by adding $Ca(OH)_2$, $CaCO_3$, or a mixture thereof to the solution. Settling of the precipitate is improved by adding $CaSO_4$ to the aqueous solution during the reaction forming the precipitate. The resultant precipitate is readily filterable from the aqueous phase. The aqueous phase which remains is virtually HF-free and can be reused for scrubbing HF-containing gas. The neutralization reaction which accompanies addition of the $Ca(OH)_2$ or $CaCO_3$ to the aqueous solution can be carried out in two steps, first to partially neutralize the solution, e.g. pH up to 6 so that the solution is still able to be pumped to a settling tank for example, and second to complete neutralization in the settling tank. The $CaSO_4$ addition can be postponed until addition of $Ca(OH)_2$, $CaCO_3$ or mixture thereof to the settling tank.

---

This invention is directed to removal of HF from an HF-containing gas.

Dutch patent publication 7003378 laid open for public inspection on Sept. 15, 1970, discloses removing F-containing contaminants from waste gases by taking up the gas in an aqueous solution which contains $Ca(OH)_2$ whereby the pH of the solution is brought to a final value of 5 to 8 and the resultant insoluble $CaF_2$ is separated from the solution. Chlorides or sulfates of iron or aluminum or an organic flocculant such as polyacrylamide can be added to the solution to assist in settling the $CaF_2$. The precipitation reaction is disclosed as optionally being carried out in the presence of soluble alkaline earth salts such as $CaCl_2$ and $MgCl_2$.

The present invention is a process for removing HF (hydrogen fluoride) from an HF-containing gas, such as waste gas from chemical processes as described in the aforementioned Dutch patent publication. One such chemical process would be the combustion of a hydrocarbon fuel such as oil in the presence of gaseous fluorocarbon waste which converts the waste to $COF_2$ which, in turn, reacts with water vapor present to form HF and $CO_2$.

The process of the present invention can be summarized as comprising contacting the HF-containing gas with water to form an aqueous HF solution and neutralizing this solution with $Ca(OH)_2$, $CaCO_3$, or mixtures thereof in the presence of $CaSO_4$ which improves the settling rate of the resultant $CaF_2$ precipitate over that when no $CaSO_4$ is present.

In greater detail, the HF is removed from the gas according to the process of the present invention by contacting the gas with water to form an aqueous solution of HF. The remaining gas phase is virtually HF-free, and so long as HF was the only objectionable contaminant in the gas before water contact, the remaining gas can be vented to the atmosphere. The step of contacting the gas with water involves conventional scrubbing procedures such as spraying the gas with water, bubbling the gas through water, or any combination of such procedures wherein all portions of the gas come into contact with the water so that HF in the gas enters the water as an aqueous solution thereof. The concentration of HF in the resultant solution is conveniently from 0.1 to 5 percent based on the total weight of the solution.

The next step in the process is to convert the HF in the water into a form which is removable from the water so that the water can be reused such as for contacting additional HF-containing gas. This is accomplished by adding $Ca(OH)_2$, $CaCO_3$, or a mixture thereof to the aqueous HF solution in an amount sufficient to neutralize the solution (pH of at least about 7) to precipitate all the fluoride ions possible as $CaF_2$ ($CaF_2$ is water soluble at 20° C. at a level of about 15 p.p.m.). The $CaF_2$ can be allowed to settle in the solution and then can be removed therefrom by conventional procedures such as by decanting the solution from the precipitate layer or filtering the precipitate from the solution or a combination of these procedures.

Unfortunately, the $CaF_2$ precipitate in a neutralized aqueous solution is in the form of a gelatinous mass which is slow to settle and difficult to filter. According to the present invention, this gelatinous nature of the precipitate is altered by the presence of $CaSO_4$ during formation of the precipitate to a form which settles more rapidly and which is more readily filterable from the aqueous solution.

The neutralizing agents, i.e. $Ca(OH)_2$ and $CaCO_3$, and the $CaSO_4$ are all water-insoluble except to a very small degree and therefore are conveniently added to the aqueous HF solution in the form of an aqueous slurry of a concentration desired depending on the method of addition. Conversion of all the fluoride ion to $CaF_2$ requires at least a stoichiometric amount of neutralizing agent relative to the amount of HF present in the solution. More often, to insure complete conversion, an excess of the neutralizing agent will be used. The amount of $CaSO_4$ used is not critical so long as the amount is effective to improve the settling rate of the $CaF_2$ precipitate. Generally, the amount of $CaSO_4$ used will be from 5 to 15 percent of the weight of neutralizing agent used.

The water used in forming the aqueous solution of HF and the slurry of neutralizing agent can conveniently be at tap temperature, e.g. 10–30° C., or lower or higher. In the case of the HF-containing gas being a combustion product, the gas will heat up the water, e.g. to 40° C., depending on the relative temperatures and amounts of water and gas involved, and the process will still be operable.

In one embodiment, the neutralizing agent and $CaSO_4$ are added together to the aqueous solution of HF until complete neutralization is obtained whereupon the $CaF_2$ formed rapidly settles for ready removal from the aqueous solution.

In another embodiment, the neutralization is carried out in steps, involving addition of an amount of neutralizing agent that only partially neutralizes the aqueous solution of HF, e.g. to raise the pH of the solution to from 2 to 6, and preferably, from 3 to 5 or 6. At this level of neutralization, the $CaF_2$ readily settles but too much fluoride ion remains in solution for the neutralization to stop there. The partially neutralized solution, including the $CaF_2$ precipitate is then transferred such as by pumping to an environment such as a settling tank which permits settling of the precipitate. The second addition of neutralizing agent is done into the settling tank to effect complete neutralization of the solution. The resultant $CaF_2$ is readily removed from the aqueous solution.

Since the precipitate formed in the partial neutralization step is not very gelatinous, the presence of $CaSO_4$ may not be required in the first addition step, and the $CaSO_4$ can be added along with the neutralizing agent in the second addition step. Some or all of the $CaSO_4$ can be added in the first addition step, if desired, depending on how high the pH of the solution becomes in the first addition step and the concentration of $CaF_2$ formed in the solution at such pH level.

By way of example, a fluorocarbon waste gas composed mainly of $CHClF_2$ was fed into the combustion zone formed from burning natural gas in air in the following proportions: 2 to 3 percent waste gas, 7 to 8 percent natural gas, and about 90 percent air (volume basis), and the resultant HF-containing gas was bubbled through a vessel of water to form a solution of 0.5 percent by weight HF in water. Fifty cc. portions of this solution were used in the following examples.

EXAMPLE 1

To one 50 cc. portion of the solution was added a slurry of $Ca(OH)_2$ sufficient to supply a concentration of 1.0 g. of $Ca(OH)_2$ in the medium. The medium was stirred until the pH was constant at 12.45. The medium was transferred to a Nessler tube to form a column 8.5 inches high. After 180 minutes settling time in the tube, no settling of the precipitate in the tube could be observed.

In a repeat of this experiment, except that the $$Ca(OH)_2$$

slurry contained 0.1 g. of $CaSO_4$, the pH of the medium was 11.10, and after only 15 minutes in the settling tube, the height of the precipitate was only 1 inch and the clear solution or supernate above the precipitate was 7.5 inches, illustrating the improved settling caused by the presence of the $CaSO_4$ in the medium. The precipitate was filterable through nylon filter cloth.

EXAMPLE 2

The procedure of the first paragraph of Example 1 was repeated except that only 0.77 g. of $Ca(OH)_2$ was stirred into the HF solution and the pH of the medium was 8.85. After 120 minutes, no settling of the precipitate in the Nessler tube could be observed. When this experiment was repeated except that only 0.5 g. of $Ca(OH)_2$ was stirred into the HF solution, the pH was 2.3, and after 180 minutes in the Nessler tube, the height of precipitate was only 1 inch, illustrating the rapid settling of $CaF_2$ at a low pH where neutralization was incomplete. Even more rapid and more complete settling (precipitate height of 0.5 inch or less) was obtained by replacing the 0.5 g. of $Ca(OH)_2$ by 0.5 g. of $CaCO_3$ giving a pH of 3.35 or by a mixture of 0.2 g. $Ca(OH)_2$ and 1.25 g. of $CaCO_3$ to give a pH of 4.85. These fast settling precipitate-containing solutions can be pumped to a holding tank for further addition of $CaSO_4$ along with added neutralizing agent to give complete neutralization of the solution and rapid settling of precipitate.

EXAMPLE 3

The procedure of the second paragraph of Example 1 was repeated except that the amounts of $Ca(OH)_2$ and $CaSO_4$ added to the aqueous solution of HF was 1.0 g. and 0.05 g., respectively, to give a pH of 11.70, and after 45 minutes in the settling tube, the height of precipitate was 1.25 inch and the height of supernate was 7.25 inch.

As many apparently widely different embodiments of this invention may be made without departing from the spirit and scope thereof, it is to be understood that this invention is not limited to the specific embodiments thereof except as defined in the appended claims.

I claim:
1. A process for removing HF from an HF-containing gas, comprising contacting the gas with water to form an aqueous solution of said HF, adding to said solution a neutralizing amount of $Ca(OH)_2$ to precipitate the fluoride ion of said HF as $CaF_2$, and adding 5 to 15% of $CaSO_4$ based on the weight of $Ca(OH)_2$ to said solution during the formation of said precipitate to improve the settling thereof in said solution.
2. The process of claim 1 wherein the $Ca(OH)_2$ is added to the aqueous solution as an aqueous slurry.
3. The process of claim 1 wherein the addition of $Ca(OH)_2$ is done in two steps, in the first step in a sufficient amount to increase the pH of the aqueous solution to from 3 to 6, followed by transfer of the resultant solution to a settling environment, and in the second step to said solution in said environment in a sufficient amount to neutralize said solution and the $CaSO_4$ addition is done to the solution in said second step.
4. The process of claim 1 followed by removing the settled precipitate from the solution.

References Cited
UNITED STATES PATENTS

| | | | |
|---|---|---|---|
| 2,152,364 | 3/1939 | Seyfried | 23—88 |
| 2,371,759 | 3/1945 | King et al. | 23—88 |
| 2,914,474 | 11/1959 | Hillyer et al. | 23—88 X |
| 3,551,332 | 12/1970 | Baumann et al. | 23—88 |

EDWARD STERN, Primary Examiner

U.S. Cl. X.R.

55—71; 423—483